(12) United States Patent
Choo et al.

(10) Patent No.: US 8,163,043 B2
(45) Date of Patent: Apr. 24, 2012

(54) PALM-BASED BIODIESEL FOUNDATION

(75) Inventors: Yuen May Choo, Selangor Darul Ehsan (MY); Ah Ngan Ma, Selangor Darul Ehsan (MY); Yusof Basiron, Selangor Darul Ehsan (MY); Chee Liang Yung, Selangor Darul Ehsan (MY); Sit Foon Cheng, Selangor Darul Ehsan (MY)

(73) Assignee: Malaysian Palm Oil Board, Selangor (MY)

( * ) Notice: Subject to any disclaimer, the term of this patent is extended or adjusted under 35 U.S.C. 154(b) by 1439 days.

(21) Appl. No.: 11/449,745

(22) Filed: Jun. 9, 2006

(65) Prior Publication Data
US 2006/0288637 A1    Dec. 28, 2006

(30) Foreign Application Priority Data
Jun. 10, 2005   (MY) ............................... PI 2005 2639

(51) Int. Cl.
*C10L 1/18*    (2006.01)
(52) U.S. Cl. .......................................... 44/385; 44/393
(58) Field of Classification Search .................. 44/389, 44/388, 385, 393; 524/523
See application file for complete search history.

(56) References Cited

U.S. PATENT DOCUMENTS

| | | | |
|---|---|---|---|
| 2004/0010072 A1* | 1/2004 | Krull et al. ..................... | 524/523 |
| 2004/0244278 A1* | 12/2004 | Siggelkow et al. ............. | 44/389 |
| 2005/0262760 A1* | 12/2005 | Lawson et al. .................. | 44/388 |
| 2006/0213118 A1 | 9/2006 | Mittelbach et al. | |

FOREIGN PATENT DOCUMENTS

GB          2 127 433 A      4/1984
* cited by examiner

*Primary Examiner* — Michael Marcheschi
*Assistant Examiner* — Chantel Graham
(74) *Attorney, Agent, or Firm* — Birch, Stewart, Kolasch & Birch, LLP

(57) ABSTRACT

Palm-based biodiesel formulations with enhanced cold flow properties are provided including the following: (I) A biodiesel formulation comprising not more than 40 vol % palm-based biodiesel and not less than 60 vol % petroleum-based file 1 oil; (II) A biodiesel formulation comprising not more than 20 wt % palm-based biodiesel and not less than 80 wt % alkyl ester of $C_6$-$C_{18}$ saturated or unsaturated fatty acid, or a mixture thereof; (III) A biodiesel formulation comprising approximately 0.1-1.0% (wt/vol) of a polyalkyl methacrylate (PAMA) additive and a palm-based biodiesel blend comprising i) not more than 40 vol % palm-based biodiesel; and ii) not less than 60 vol % petroleum-based fuel oil; (IV) A biodiesel formulation comprising approximately 0.1-5.0% (wt/vol) of a polyalkyl methacrylate (PAMA) additive and a palm-based biodiesel having unsaturation level of not less than 60%.

5 Claims, No Drawings

PALM-BASED BIODIESEL FOUNDATION

The present application claims priority to application no. PI 2005 2639, which was filed in Malaysia on Jun. 10, 2005. The contents of which are herein incorporated by reference in its entirety.

FIELD OF THE INVENTION

The present invention relates to methods for enhancing cold flow properties of a palm-based biodiesel and to palm-based biodiesel formulations with enhanced cold flow properties.

BACKGROUND OF THE INVENTION

Biodiesel is fast becoming the substitute for petroleum-based fuel oil as the price of petroleum-based fuel oil continues to scale up high. One of the major problems associated with the use of biodiesel is its poor cold flow properties resulting from crystallization of saturated fatty compounds in cold condition.

In temperate countries, fuel oils are graded according to their cold flow properties: a summer grade fuel oil should exhibit pour point of not higher than 0° C., a spring or autumn grade fuel oil should exhibit pour point of not higher than –10° C. and a winter grade fuel oil should exhibit pour point of not higher than –20° C.

Palm-based biodiesel comprises palm products such as palm oil, palm olein, palm stearin, palm kernel oil, palm kernel olein and palm kernel stearin in crude or refined form and alkyl esters of palm products, particularly methyl esters of palm products. Palm-based biodiesel exhibits a relatively high pour point (approximately 15° C.) due to its high content of saturated fatty compounds; hence, its use is only suitable for tropical countries and unsuitable for temperate or cold climate countries where operational temperature is below its pour point.

Blending palm-based biodiesel with petroleum-based fuel oil such as diesel, kerosene and naphtha helps to lower down its pour point to a certain extent but the resultant palm-based biodiesel still does not qualify as winter grade fuel oil for use in extremely low temperature.

Pour point depressants or cold flow additives have been added to petroleum-based fuel oil to improve its cold flow properties. There is a wide range of pour point depressants available for use with petroleum-based fuel oil but normally they have limited effect on biodiesel.

U.S. Pat. No. 5,520,708 provides a method for reducing the crystallization temperature of a liquid fatty acid ester-petroleum distillate fuel blend comprising combining a petroleum distillate with an amount of a fatty acid ester of an animal or vegetable fat or oil selected from the group consisting of an isopropyl ester, a 2-butyl ester, a tert-butyl ester and mixtures thereof, wherein said amount is effective to lower the crystallization onset point of the blend by about 8°-20° C. below that of a blend comprising the same amount of methyl ester. In short, a fuel blend with lower crystallization onset point can be obtained by combining petroleum distillate with fatty acid ester of isopropanol, 2-butanol, t-butanol or mixtures thereof, instead of combining petroleum distillate with fatty acid ester of methanol. Judging by the fact that the preferred source of fatty acid is soybean oil, the preferred fatty acid ester is unsaturated fatty acid ester such as oleate and linoleate esters. The same result cannot be achieved if soybean oil is substituted by palm products as soybean oil and palm products have different fatty acid composition.

U.S. Pat. No. 6,203,585 discloses a biodiesel fuel composition having depressed pour point comprising:
(I) from about 95% to about 99%, by weight of the composition, of a methyl ester, or mixtures thereof, of fatty acids having from about 14 to about 24 carbon atoms; wherein said methyl ester has an iodine value from about 75 to about 125; and
(II) from about 1% to about 5%, by weight of the composition, of a copolymer additive comprising:
 (A) from about 25% to about 75%, by weight of the copolymer additive, of a polymer comprising:
  (i) from about 70% to about 99.5%, by weight of the polymer, first repeating units, each derived from a $C_8$-$C_{15}$ alkyl methacrylate monomer; and
  (ii) from about 0.5% to about 30% by weight of the polymer, second repeating units, each derived from a $C_{16}$-$C_{24}$ alkyl methacrylate monomer; and
 (B) from about 25% to about 75%, by weight of the copolymer additive, of a diluent which can be mineral oil, vegetable oil, polyol ester or mixtures thereof.

The copolymer additive of this patent does not have the same pour point depressing effect on methyl ester of palm products.

SUMMARY OF THE INVENTION

Palm-based biodiesel formulations with enhanced cold flow properties are provided including the following:
(I) A biodiesel formulation comprising not more than 40 vol % palm-based biodiesel and not less than 60 vol % petroleum-based fuel oil;
(II) A biodiesel formulation comprising not more than 20 wt % palm-based biodiesel and not less than 80 wt % alkyl ester of $C_6$-$C_{18}$ saturated or unsaturated fatty acid, or a mixture thereof, wherein the alkyl ester is methyl, ethyl, isopropyl, n-butyl, 2-butyl or isobutyl ester, or a mixture thereof;
(III) A biodiesel formulation comprising approximately 0.1-1.0% (wt/vol) of a polylkyl methacrylate (PAMA) additive and a palm-based biodiesel blend comprising
 i) not more than 40 vol % palm-based biodiesel; and
 ii) not less than 60 vol % petroleum-based fuel oil;
(IV) A biodiesel formulation comprising approximately 0.1-5.0% (wt/vol) of a polylkyl methacrylate (PAMA) additive and a palm-based biodiesel having unsaturation level of not less than 60%.

The palm-based biodiesel can be a palm product such as palm oil, palm olein, palm stearin, palm kernel oil, palm kernel olein and palm kernel stearin, or a mixture thereof, in crude or refined form; or alkyl esters of palm product, particularly methyl esters of palm product; or a mixture of palm product and alkyl esters of palm product.

The palm-based biodiesel of Formulation III is preferably alkyl esters of palm products.

The petroleum-based fuel oil can be naptha or middle distillates including kerosene and diesel. The petroleum-based fuel oil is preferably diesel no.1.

The alkyl ester of biodiesel formulation (II) is preferably alkyl ester of caprylic ($C_8$), capric ($C_{10}$), lauric ($C_{12}$), myristic ($C_{14}$) or oleic ($C_{18:1}$) acid, or a mixture thereof, and more preferably alkyl ester of caprylic ($C_8$), capric ($C_{10}$) or oleic ($C_{18:1}$) acid, or a mixture thereof.

DETAIL DESCRIPTION OF THE INVENTION

The present invention is about methods for enhancing cold flow properties of palm-based biodiesel and about formulations of palm-based biodiesel having enhanced cold flow properties.

Methods for enhancing cold flow properties of a palm-based biodiesel are:
(A) blending a palm-based biodiesel with a petroleum-based fuel oil to form a palm-based biodiesel blend;
(B) blending a palm-based biodiesel or palm-based biodiesel blend with alkyl ester of $C_6$-$C_{18}$ saturated or unsaturated fatty acid, or a mixture thereof, wherein the alkyl ester is methyl, ethyl, isopropyl, n-butyl, 2-butyl or isobutyl ester, or a mixture thereof;
(C) blending a palm-based biodiesel blend with a polyalkyl methacrylate (PAMA) additive;
(D) enhancing the unsaturation level of a palm-based biodiesel before blending it with a polyalkyl methacrylate (PAMA) additive.

Formulations of palm-based biodiesel resulting from the methods as mentioned above are:
Formulation I comprising not more than 40 vol % palm-based biodiesel and not less than 60 vol % petroleum-based fuel oil;
Formulation II comprising not more than 20 wt % palm-based biodiesel and not less than 80 wt % alkyl ester of $C_6$-$C_{18}$ saturated or unsaturated fatty acid, or a mixture thereof, wherein the alkyl ester is methyl, ethyl, isopropyl, n-butyl, 2-butyl or isobutyl ester, or a mixture thereof;
Formulation III comprising approximately 0.1-1.0% (wt/vol) of a polylkyl methacrylate (PAMA) additive and a palm-based biodiesel blend comprising
iii) not more than 40 vol % palm-based biodiesel; and
iv) not less than 60 vol % petroleum-based fuel oil;
Formulation IV comprising approximately 0.1-5.0% (wt/vol) of a polylkyl methacrylate (PAMA) additive and a palm-based biodiesel having unsaturation level of not less than 60%.

The palm-based biodiesel is referring to a palm product or alkyl esters of palm product, or a mixture thereof. Palm product comprises palm oil, palm olein, palm stearin, palm kernel oil, palm kernel olein and palm kernel stearin, or a mixture thereof, in crude or refined form. Alkyl esters of palm product are particularly methyl esters of palm product. The palm-based biodiesel of Formulation III is preferably alkyl esters of palm product.

The palm-based biodiesel blend is referring to a blend of palm-based biodiesel and petroleum-based fuel oil wherein the petroleum-based fuel oil is naphtha or middle distillates including kerosene and diesel. The petroleum-based fuel oil is preferably diesel no. 1.

Alkyl esters of palm products can be prepared by transesterifying a palm product with an alcohol, selected from the group comprising methanol, ethanol, isopropanol, n-butanol, 2-butanol, isobutanol and a mixture thereof, in the presence of an acid or alkali catalyst. Alkyl esters of $C_6$-$C_{18}$ saturated or unsaturated fatty acid can be prepared by esterifying the mentioned fatty acid with an alcohol selected from the group as mentioned above in the presence of an acid or alkali catalyst or by transesterifying an oil or fat with an alcohol selected from the group as mentioned above in the presence of an acid or alkali catalyst to obtain a mixture of alkyl esters, followed by fractionating the mixture of alkyl esters to obtain alkyl esters of the mentioned fatty acid. The alkyl ester of Formulation II is preferably alkyl ester of caprylic ($C_8$), capric ($C_{10}$), lauric ($C_{12}$), myristic ($C_{14}$) or oleic ($C_{18:1}$) acid, or a mixture thereof, and more preferably alkyl ester of caprylic ($C_8$), capric ($C_{10}$) or oleic ($C_{18:1}$) acid, or a mixture thereof.

The oil or fat is referring to any oil or fat, derived from plants or animals, containing triglycerides with saturated or unsaturated acyl groups and wherein the acyl groups include those with carbon chain length of $C_6$ to $C_{18}$.

The palm-based biodiesel having unsaturation level of not less than 60% of Formulation IV can be prepared by any of the following ways:
a) fractionating palm products to obtain a palm fraction having unsaturation level of not less than 60%;
b) transesterifying the mentioned palm fraction with an alkyl alcohol to obtain alkyl esters of the palm fraction;
c) fractionating alkyl esters of palm products to obtain a fraction of alkyl esters having unsaturation level of not less than 60%;
d) esterifying an unsaturated fatty acid or a mixture of fatty acids having unsaturation level of not less than 60% with an alkyl alcohol.

Polyalkyl methacrylate (PAMA) additive is a cold flow additive in suitable carrier or diluents. PAMA additive is commercially available, for example PAMA additive from RohMax GmbH under the tradename Viscoplex®10-305. PAMA additive normally perform well as cold flow additive for biodiesel derived from rapeseed oil or soybean oil but not for palm-based biodiesel. Methods (C) and (D) of the present invention provided means for making PAMA additive perform as cold flow additive for palm-based biodiesel.

The following examples are constructed to illustrate the present invention in a non-limiting sense.

EXAMPLE 1

Preparation of Alkyl Esters
a) Methyl Ester

Methyl ester of various carbon chain lengths ($C_8$-$C_{18}$) is synthesized via acid-catalyzed direct esterification. The synthesizing process comprises the following steps:
i) transferring a stoikiometric amount of the respective fatty acid and methanol into a two-necked round bottom flask;
ii) adding an excess of five (5) moles of methanol into the flask;
iii) equipping the flask with a magnetic stirrer, a soxhlet containing a thimble filled with molecular sieves, a condenser and a heating plate;
iv) heating the reaction mixture and adding 0.5% to 1% of concentrated sulphuric acid or p-toluene sulfonic acid to the reaction mixture as catalyst when the reaction mixture has reached a desired temperature;
v) carrying out the reaction at an elevated temperature of approximately 120° C. for five (5) hours or until the reaction is complete;
vi) monitoring progress of the reaction by using thin layer chromatography (TLC) wherein a solvent system of 50% (vol/vol) chloroform in hexane is used for developing chromatograms and iodine vapour is used as staining agent;
vii) washing the crude product, immediately after the reaction is complete, with warm water until the used water is neutral;
viii) drying the product by using anhydrous sodium sulphate and filtering off the hydrated sodium sulphate;
ix) removing any coloured or decomposed materials formed during the reaction by passing the dried product through a column packed with silica gel;
x) further removing trace solvent from the product by using a vacuum pump to obtain purified methyl ester.

b) Isopropyl Ester

The synthesizing process for methyl ester is repeated for synthesizing isopropyl ester except that isopropanol is used in place of methanol.

c) n-Butyl Ester

The synthesizing process for methyl ester is repeated for synthesizing n-butyl ester except that n-butanol is used in place of methanol and the thimble is substituted by a modified Dean & Stark distillation set-up and a dropping funnel for continuous removal of water formed during reaction.

d) 2-Butyl Ester

The synthesizing process for n-butyl ester is repeated for synthesizing 2-butyl ester except that 2-butanol is used in place of n-butanol.

Pour points (including those in subsequent examples) of the synthesized alkyl esters are determine according to standard method ASTM D97. Table 1 shows the pour points of the synthesized alkyl esters. Alkyl esters having shorter acyl chain length and those having unsaturated acyl chain exhibit lower pour points.

TABLE 1

Pour Points of Alkyl Esters

| | POUR POINT (° C.) | | | |
|---|---|---|---|---|
| acyl chain length | Methyl Ester | Isopropyl Ester | n-Butyl Ester | 2-Butyl Ester |
| $C_8$ | −42 | −58 | −48 | −54 |
| $C_{10}$ | −9 | −12 | −39 | −33 |
| $C_{12}$ | 0 | −9 | −24 | −25 |
| $C_{14}$ | 21 | 9 | −3 | −15 |
| $C_{16}$ | 27 | 15 | 9 | 2 |
| $C_{18}$ | 36 | 21 | 18 | 12 |
| $C_{18:1}$ | −18 | −24 | −33 | −42 |

EXAMPLE 2

Palm oil methyl ester is blended with diesel no. 1 in various volume ratios and pour points of the resultant blends are tabulated in Table 2. A palm-based biodiesel blend comprising not more than 40 vol % palm-based biodiesel and not less than 60 vol % petroleum-based fuel oil is suitable to be used as fuel oil for temperate or cold climate countries.

TABLE 2

Pour Points of Palm Oil Methyl Ester: Diesel No. 1 Blends

| ratio (vol/vol) | | |
|---|---|---|
| Palm Oil Methyl Ester | Diesel No. 1 | pour point (° C.) |
| 0 | 100 | −33 |
| 5 | 95 | −27 |
| 10 | 90 | −18 |
| 20 | 80 | −9 |
| 40 | 60 | −3 |
| 60 | 40 | 6 |
| 80 | 20 | 9 |
| 100 | 0 | 15 |

EXAMPLE 3

Refined, bleached and deodorized (RBD) palm oil and RBD palm olein are blended with diesel no. 1 in volume ratios of 5:95, 10:90 and 20:80. Pour points of the resultant blends are tabulated in Table 3.

TABLE 3

Pour Points of Palm-Based Biodiesel Blends

| ratio (vol/vol) | | |
|---|---|---|
| | Diesel No. 1 | pour point (° C.) |
| RBD Palm Oil | | |
| 5 | 95 | −24 |
| 10 | 90 | −18 |
| 20 | 80 | −9 |
| RBD Palm Olein | | |
| 5 | 95 | −24 |
| 10 | 90 | −18 |
| 20 | 80 | −12 |

EXAMPLE 4

Palm oil methyl ester is blended with isopropyl oleate in various weight ratios and pour points of the resultant blends are tabulated in Table 4. A palm-based biodiesel comprising not more than 20 wt % palm oil methyl ester and not less than 80 wt % isopropyl oleate is suitable to be used as fuel oil for temperate or cold climate countries.

TABLE 4

Pour Points of Palm Oil Methyl Ester: Isopropyl Oleate Blends

| ratio (wt/wt) | | |
|---|---|---|
| Palm Oil Methyl Ester | Isopropyl Oleate | pour point (° C.) |
| 100 | 0 | 15 |
| 80 | 20 | 15 |
| 60 | 40 | 9 |
| 40 | 60 | 6 |
| 20 | 80 | −9 |
| 0 | 100 | −24 |

EXAMPLE 5

A mixture comprising mainly methyl esters of caprylic ($C_8$) and capric ($C_{10}$) acids (hereinafter referred to as Mixture I) is blended with palm oil methyl ester and refined, bleached and deodorized (RBD) palm olein respectively in various weight ratios. Pour points of the resultant blends are tabulated in Table 5 and Table 6. A palm-based biodiesel comprising not more than 20 wt % of palm oil methyl ester or RBD palm olein and not less than 80 wt % of Mixture I is suitable to be used as fuel oil for temperate or cold climate countries.

TABLE 5

Pour Points of Palm Oil Methyl Ester: Mixture I Blends

| ratio (wt/wt) | | |
|---|---|---|
| Palm Oil Methyl Ester | Mixture I | pour point (° C.) |
| 100 | 0 | 15 |
| 80 | 20 | 15 |
| 60 | 40 | 9 |
| 40 | 60 | 3 |
| 20 | 80 | −12 |
| 0 | 100 | −30 |

TABLE 6

Pour Points of RBD Palm Olein: Mixture I Blends

| ratio (wt/wt) | | |
| --- | --- | --- |
| RBD Palm Olein | Mixture I | pour point (° C.) |
| 100 | 0 | 9 |
| 80 | 20 | 9 |
| 60 | 40 | 6 |
| 40 | 60 | 3 |
| 20 | 80 | −15 |
| 0 | 100 | −30 |

EXAMPLE 6

Methyl esters of refined, bleached and deodorized (RBD) palm stearin and RBD palm kernel olein are blended with diesel no. 1 in volume ratio of 20:80 to form palm-based biodiesel blend I and palm-based biodiesel blend II respectively. A portion of palm-based biodiesel blend I is treated with a PAMA additive (Viscoplex® 10-305) in dosage in 0.5% (wt/vol) and another portion of it is treated in dosage of 1.0% (wt/vol). Pour points of the resultant blends are tabulated in Table 7.

TABLE 7

Pour Points of Palm-Based Biodiesel Blends

| PALM-BASED BIODIESEL BLEND | DOSAGE OF VISCOPLEX® 10-305 % (WT/vol) | POUR POINT (° C.) | |
| --- | --- | --- | --- |
| | | Before | After |
| I | 0.5 | −6 | −12 |
| I | 1.0 | −6 | −15 |
| II | — | −27 | — |

EXAMPLE 7

Conventional palm oil methyl ester having unsaturation level of approximately 49.6% is blended with diesel no. 1 in volume ratio of 30:70 to form palm-based biodiesel blend III and in volume ratio of 40:60 to form palm-based biodiesel blend IV. Then, the palm-based biodiesel blends are treated with Viscoplex®10-305 in a dosage of 0.75% (wt/vol). Pour Points of the resultant blends are tabulated in Table 8.

TABLE 8

Pour Point of Palm-Based Biodiesel Blend

| | POUR POINT (° C.) | |
| --- | --- | --- |
| PALM-BASED BIODIESEL BLEND | Before treatment with Viscoplex® 10-305 | After treatment with Viscoplex® 10-305 |
| III | −3 | −15 |
| IV | −3 | −6 |

EXAMPLE 8

A palm-based biodiesel blend comprising 20 vol % conventional palm oil methyl ester and 80 vol % diesel no.1 is treated with Viscoplex®10-305 in various dosages. Pour points of the resultant blends are tabulated in Table 9. When a palm oil methyl ester having unsaturation level of not less than 60% is used in place of conventional palm oil methyl ester, pour point of the resultant blend is further depressed.

TABLE 9

Pour Point of Palm-Based Biodiesel Blend

| PALM-BASED BIODIESEL BLEND | DOSAGE OF VISCOPLEX® 10-305 % (WT/vol) | POUR POINT (° C.) | |
| --- | --- | --- | --- |
| | | Before | After |
| Conventional | 0.10 | −9 | −18 |
| Conventional | 0.20 | −9 | −21 |
| Conventional | 0.75 | −9 | −24 |
| Unsaturation level between 60 to 72% | 0.10 | −12 to −18 | −24 |
| Unsaturation level between 72 to 92% | — | −21 to −30 | — |

EXAMPLE 9

Palm oil methyl ester of various unsaturation levels is treated with Viscoplex®10-305 in various dosages. Pour points of the treated palm oil methyl esters are tabulated in Table 10. Viscoplex®10-305 does not have a pour point depressing effect on conventional palm oil methyl ester having unsaturation level of approximately 49.6%.

TABLE 10

Pour Points of Treated Palm Oil Methyl Esters

| UNSATURATION LEVEL OF PALM OIL METHYL ESTER (%) | DOSAGE OF VISCOPLEX® 10-305 (WT %) | POUR POINT (° C.) | |
| --- | --- | --- | --- |
| | | Before | After |
| 49.6 | 5.0 | 15 | 12 |
| 49.6 | 9.3 | 15 | 12 |
| 67.7 | 4.0 | 6 | −3 |
| 69.7 | 4.0 | 6 | −6 |
| 75.3 | 4.0 | 3 | −9 |
| 86.7 | 0.5 | −9 | −12 |
| 86.7 | 0.8 | −9 | −24 |
| 86.7 | 1.0 | −9 | −30 |
| 86.7 | 2.0 | −9 | −30 |

The invention claimed is:

1. A biodiesel formulation consisting of
approximately 0.1-1.0% (wt/vol) of a polvalkyl methacrylate (PAMA) additive and
a palm-based biodiesel blend consisting of both a palm-based biodiesel and a petroleum-based fuel oil, wherein the palm-based biodiesel is in a concentration of not more than 40 vol %; and wherein the petroleum-based fuel oil is in a concentration of not less than 60 vol %.

2. A biodiesel formulation consisting of approximately 0.1-5.0% (wt/vol) of a polvalkyl methacrylate (PAMA) additive and a palm-based biodiesel having unsaturation level of not less than 60%.

3. The biodiesel formulation of claim 2 wherein the palm-based biodiesel having unsaturation level of not less than 60% is a fraction of a palm product or alkyl esters of palm product, or a mixture thereof.

4. The biodiesel formulation of claim 3 wherein palm product is palm oil, palm olein, palm stearin, palm kernel oil, palm kernel olein and palm kernel stearin, or a mixture thereof, in crude or refined form.

5. The biodiesel formulation of claim 3 wherein alkyl esters of palm product are methyl esters of palm product.

* * * * *